US008423556B2

(12) United States Patent
Okamoto

(10) Patent No.: US 8,423,556 B2
(45) Date of Patent: Apr. 16, 2013

(54) ARCHIVE DEVICE

(75) Inventor: Hiroshi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 12/833,323

(22) Filed: Jul. 9, 2010

(65) Prior Publication Data
US 2011/0016132 A1  Jan. 20, 2011

(30) Foreign Application Priority Data

Jul. 14, 2009  (JP) .................................. 2009-166043

(51) Int. Cl.
*G06F 7/00* (2006.01)

(52) U.S. Cl.
USPC .......................................... 707/747; 707/667

(58) Field of Classification Search .................. 707/747, 707/667, 999.101, 999.204
See application file for complete search history.

(56) References Cited

U.S. PATENT DOCUMENTS

| 7,519,635 | B1* | 4/2009 | Haustein et al. ........................ 1/1 |
| 7,720,892 | B1* | 5/2010 | Healey, Jr. et al. .............. 707/831 |
| 7,761,425 | B1* | 7/2010 | Erickson et al. .............. 707/649 |
| 7,769,971 | B2* | 8/2010 | Cremelie et al. .............. 711/162 |
| 7,930,559 | B1* | 4/2011 | Beaverson et al. ........... 713/193 |
| 8,028,106 | B2* | 9/2011 | Bondurant et al. ............. 710/68 |
| 8,050,251 | B2* | 11/2011 | Ongole et al. .................. 370/351 |
| 8,161,255 | B2* | 4/2012 | Anglin et al. .................. 711/162 |
| 2002/0124137 | A1* | 9/2002 | Ulrich et al. ................... 711/113 |
| 2003/0120622 | A1* | 6/2003 | Nurmela et al. ................. 706/47 |
| 2005/0203973 | A1* | 9/2005 | Yagawa ........................ 707/204 |
| 2006/0230175 | A1* | 10/2006 | de Vries ........................ 709/231 |
| 2006/0235908 | A1* | 10/2006 | Armangau et al. ........... 707/204 |
| 2006/0271540 | A1* | 11/2006 | Williams ........................ 707/7 |
| 2007/0186032 | A1* | 8/2007 | Sinclair et al. ................. 711/103 |
| 2008/0005141 | A1* | 1/2008 | Zheng et al. .................. 707/101 |
| 2008/0133561 | A1* | 6/2008 | Dubnicki et al. .............. 707/101 |
| 2008/0152260 | A1* | 6/2008 | Cheng et al. .................. 382/284 |
| 2008/0172430 | A1* | 7/2008 | Thorstensen ................. 707/206 |
| 2008/0243878 | A1* | 10/2008 | de Spiegeleer et al. ....... 707/100 |

(Continued)

FOREIGN PATENT DOCUMENTS

| JP | 2003-524243 A | 8/2003 |
| JP | 2004-30423 A | 1/2004 |
| JP | 2005-267600 A | 9/2005 |
| WO | WO-01/61563 A1 | 8/2001 |

OTHER PUBLICATIONS

Japanese Office Action, English-language Translation, mailed Apr. 19, 2011 for corresponding Japanese Application No. 2009-166043.

*Primary Examiner* — Phuong Thao Cao
(74) *Attorney, Agent, or Firm* — Fujitsu Patent Center

(57) ABSTRACT

An archive device includes: a storage for storing divided data and attribute information, the divided data being received from an external device and divided from original data by a predetermined size, the attribute information being associated with a hash value and identification information, the hash value being calculated from the divided data, the identification information identifying the original data before being divided; and a controller for calculating a hash value for divided data that is received from the external device, writing the divided data and the attribute information corresponding to the divided data to the storage when the calculated hash value is not included in the attribute information stored in the storage, and adding the identification information corresponding to the calculated hash value to the attribute information when the calculated hash value is included in the attribute information stored in the storage.

4 Claims, 18 Drawing Sheets

U.S. PATENT DOCUMENTS

| | | | |
|---|---|---|---|
| 2008/0243953 A1* | 10/2008 | Wu et al. | 707/204 |
| 2008/0244204 A1* | 10/2008 | Cremelie et al. | 711/162 |
| 2009/0063528 A1* | 3/2009 | Yueh | 707/101 |
| 2009/0067719 A1* | 3/2009 | Sridhar et al. | 382/176 |
| 2009/0271454 A1* | 10/2009 | Anglin et al. | 707/204 |
| 2009/0313483 A1* | 12/2009 | Ranade | 713/193 |
| 2010/0262797 A1* | 10/2010 | Rosikiewicz et al. | 711/162 |
| 2010/0318759 A1* | 12/2010 | Hamilton et al. | 711/171 |
| 2011/0113016 A1* | 5/2011 | Gruhl et al. | 707/661 |
| 2011/0238635 A1* | 9/2011 | Leppard | 707/693 |
| 2012/0047284 A1* | 2/2012 | Tarkoma | 709/247 |
| 2012/0084289 A1* | 4/2012 | Hutheesing | 707/737 |

* cited by examiner

| ARCHIVE ID | HASH VALUE | DATA SIZE (MB) | STORAGE DESTINATION PATH | LINK DESTINATION | · |
|---|---|---|---|---|---|
| 001 | 1111 | 1 | /data/1 | DATA A (1) | · |
| 002 | 2222 | 1 | /data/1 | DATA A (2) | · |
| 003 | 3333 | 1 | /data/1 | DATA A (3) | · |
| 004 | 4444 | 1 | /data/1 | DATA A (4) | · |

FIG. 6A

| ARCHIVE ID | HASH VALUE | DATA SIZE (MB) | STORAGE DESTINATION PATH | LINK DESTINATION | · |
|---|---|---|---|---|---|
| 001 | 1111 | 1 | /data/1 | DATA A (1) | · |
| 002 | 2222 | 1 | /data/1 | DATA A (2) | · |
| | | | | DATA B (2) | |
| 003 | 3333 | 1 | /data/1 | DATA A (3) | · |
| | | | | DATA B (3) | |
| 004 | 4444 | 1 | /data/1 | DATA A (4) | · |
| | | | | DATA B (4) | |
| 005 | 5555 | 1 | /data/2 | DATA B (1) | · |

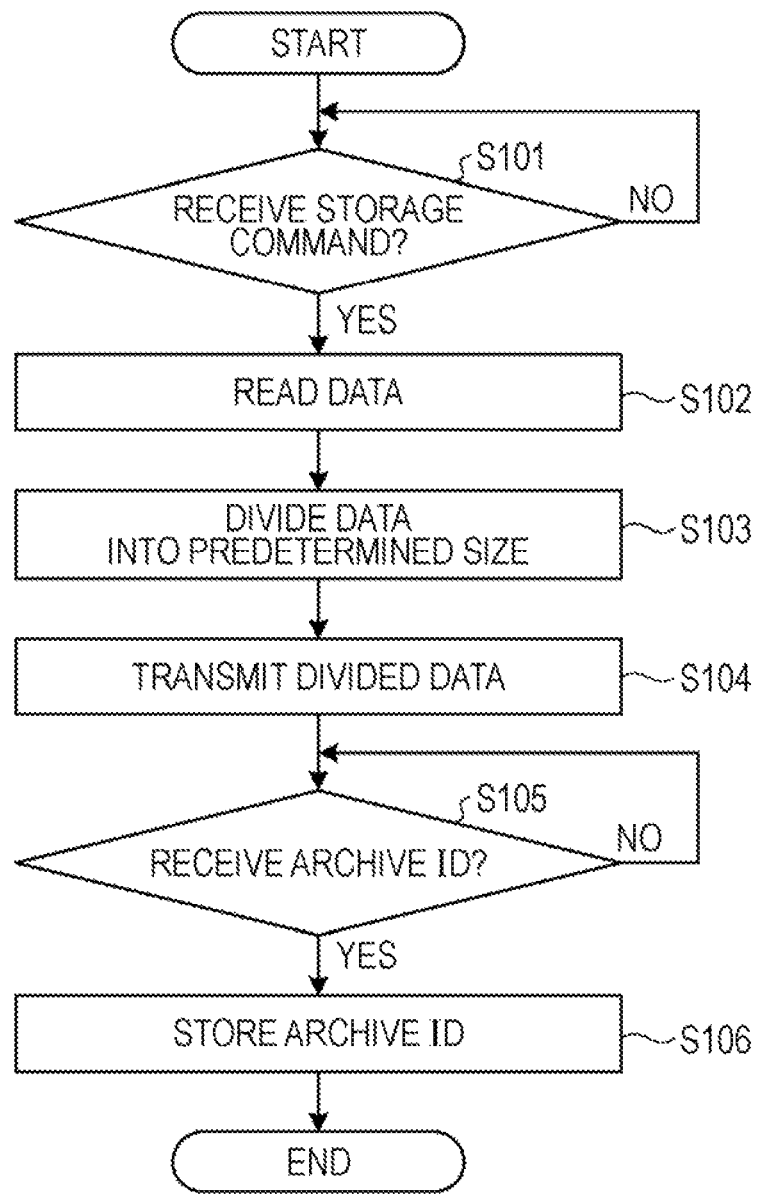

FIG. 10B

| ARCHIVE ID | HASH VALUE | DATA SIZE (MB) | STORAGE DESTINATION PATH | LINK DESTINATION | · |
|---|---|---|---|---|---|
| 001 | 1111 | 1 | /data/1 | DATA A (1) | · |
| 002 | 2222 | 1 | /data/1 | X | · |
| 003 | 3333 | 1 | /data/1 | X | · |
| 004 | 4444 | 1 | /data/1 | X | · |
| 005 | 5555 | 1 | /data/2 | DATA B (1) | · |

FIG. 10C

| TEMPORARILY DIVIDED DATA | LINK DESTINATION |
|---|---|
| X | DATA A (2 TO 4) |
|   | DATA B (2 TO 4) |

FIG. 12A

| ARCHIVE ID | HASH VALUE | DATA SIZE (MB) | STORAGE DESTINATION PATH | LINK DESTINATION | · |
|---|---|---|---|---|---|
| 001 | 1111 | 1 | /data/1 | DATA A (1) | · |
| 006 | 2222 | 3 | /data/1 | DATA A (2 TO 4) | · |
|  | · |  |  | DATA B (2 TO 4) | · |
|  | · |  |  | DATA C (2 TO 4) | · |
|  | 6666 |  |  |  | · |
| 005 | 5555 | 1 | /data/2 | DATA B (1) | · |
| 007 | 7777 | 1 | /data/3 | DATA C (1) | · |

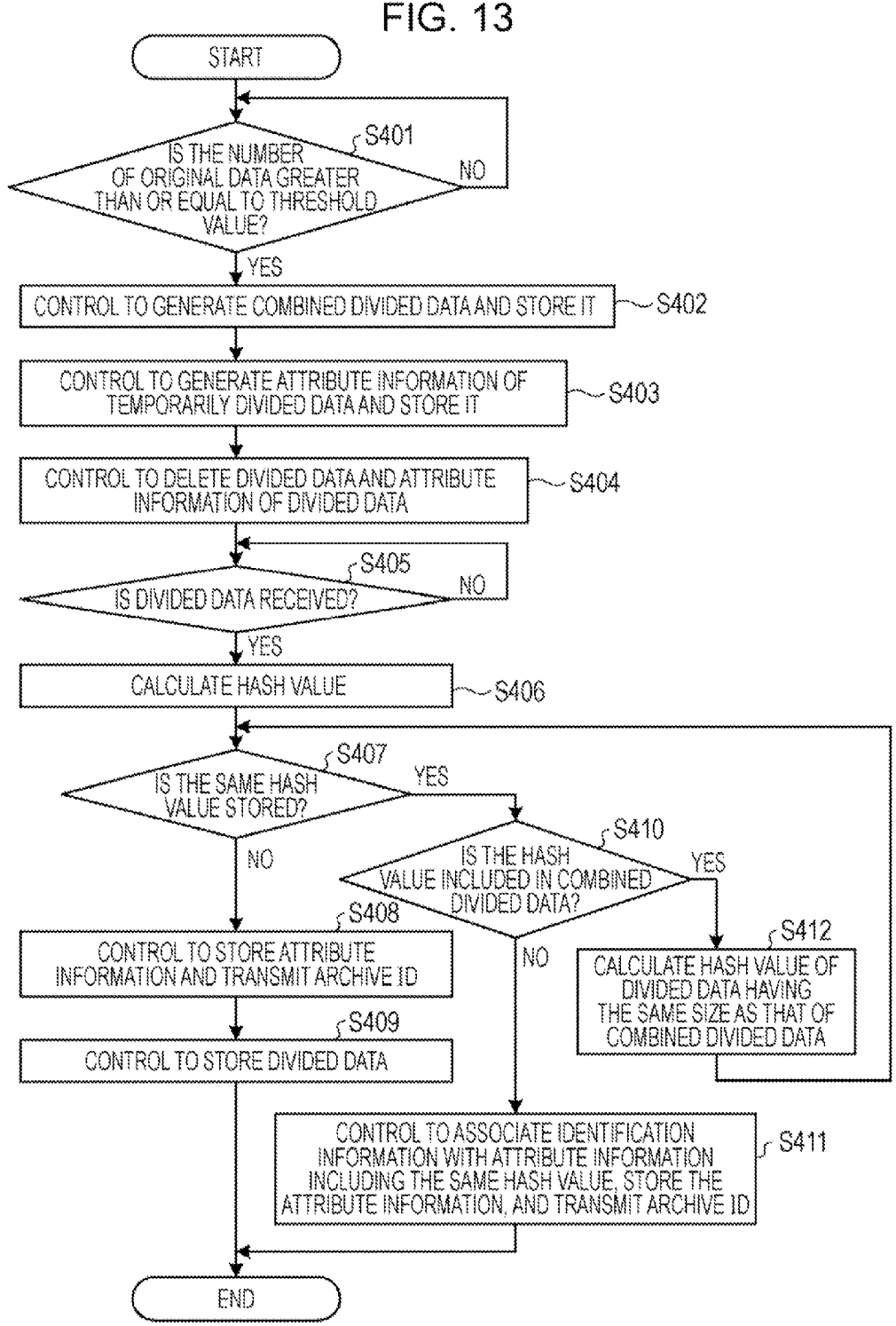

ARCHIVE DEVICE

CROSS-REFERENCE TO RELATED APPLICATION

This application is based upon and claims the benefit of priority of the prior Japanese Patent Application No. 2009-166043 filed on Jul. 14, 2009, the entire contents of which are incorporated herein by reference.

FIELD

The embodiments discussed herein are related to an archive device.

BACKGROUND

Conventionally, an archive device is used to store digital contents such as music, movies, e-mails, medical images, and document data in an integrated fashion for a long period of time. The archive device is connected to a plurality of external devices via a network, stores various digital contents (hereinafter referred to as "data") received from the external devices, and transmits the stored data to the external devices in accordance with a reference request from the external devices.

Specifically, the archive device includes a plurality of storage devices (disk array, tape library, and the like) and a processing device that performs write processing to the storage devices and read processing from the storage devices. The processing device writes data received from the external devices to the storage devices. At this time, the processing device generates and stores metadata (reception date, transmission source, storage position, and the like) for each received data. The processing device refers to the metadata in accordance with a request from a user, reads corresponding data from the storage devices, and transmits the data to the external devices.

To reduce recording volume, the archive device has a single instance function to prevent the same data as that having been already stored from being stored. Specifically, the archive device stores property information in which a hash value and a data size are associated with each other for each stored data. The archive device calculates the hash value of data newly requested to be stored, compares the calculated hash value and the data size of the data newly requested to be stored with the property information held in the archive device, and determines whether or not the same data has been already stored.

For example, when the archive device newly receives data whose hash value and data size are stored in the property information already held in the archive device, the archive device does not store the data, only generates metadata, links the generated metadata to data having been stored, and stores the metadata.

In recent years, a content delivery device that determines storage destination on the basis of a predetermined condition and stores data only in the determined storage destination to reduce recording volume is known (for example, refer to Japanese Laid-open Patent Publication No. 2004-30423). Specifically, for example, the content delivery device described above decides the storage destination in accordance with a remaining recording capacity and stores the data.

SUMMARY

According to an aspect of the embodiment, an archive device includes: a storage for storing divided data and attribute information, the divided data being received from an external device and divided from original data by a predetermined size, the attribute information being associated with a hash value and identification information, the hash value being calculated from the divided data, the identification information identifying the original data before being divided; and a controller for calculating a hash value for divided data that is received from the external device, writing the divided data and the attribute information corresponding to the divided data to the storage when the calculated hash value does not match with the hash value included in the attribute information stored in the storage, and adding the identification information corresponding to the calculated hash value to the attribute information when the calculated hash value matches with the hash value included in the attribute information stored in the storage.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are diagrams for explaining a data storage control section according to the second embodiment;

FIG. 7 is a diagram for explaining a processing procedure of an external device according to a second embodiment;

FIGS. 10A, 10B, and 10C are diagrams for explaining a data storage control section according to the third embodiment;

FIGS. 12A and 12B are diagrams for explaining a data storage control section according to a fourth embodiment;

FIG. 13 is a diagram for explaining a processing procedure of an archive device according to the fourth embodiment;

DESCRIPTION OF EMBODIMENTS

Hereinafter, embodiments of an archive device, a data storage program, and a data storage method disclosed by the present application will be described in detail with reference to the drawings.

First Embodiment

Figure 1:
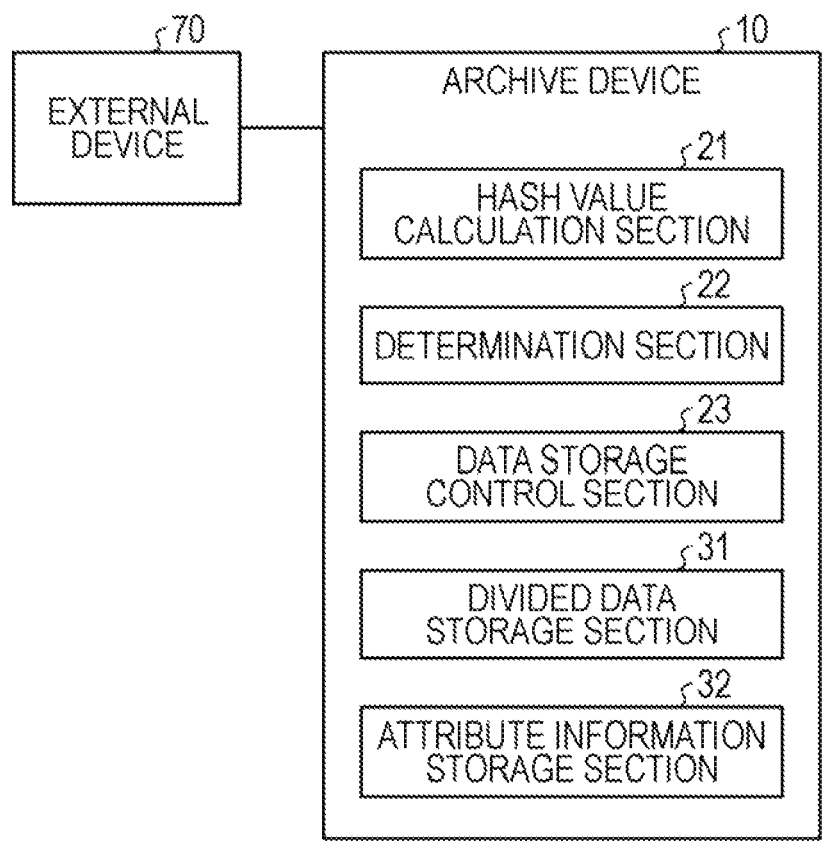
FIG. 1 is a diagram for explaining a configuration of an archive device according to a first embodiment.

First, a configuration of the archive device according to a first embodiment will be described with reference to FIG. 1. FIG. 1 is a diagram for explaining the configuration of the archive device according to the first embodiment.

As shown in FIG. 1, an archive device 10 according to the first embodiment includes a hash value calculation section 21, a determination section 22, a data storage control section 23, a divided data storage section 31, and an attribute information storage section 32, and is connected to an external device 70.

The external device 70 is connected to the archive device 10 via a network not shown in FIG. 1, and requests the archive device 10 to store data.

The divided data storage section 31 stores divided data that is received from the external device 70 and divided from original data by a predetermined size.

The attribute information storage section 32 stores attribute information in which a hash value for each divided data stored in the divided data storage section 31 is associated with identification information to identify the original data before being divided.

The hash value calculation section 21 calculates a hash value for each divided data that is received from the external device 70 and divided into a predetermined size.

The determination section 22 determines whether or not attribute information corresponding to the hash value calculated by the hash value calculation section 21 is stored in the attribute information storage section 32.

When it is determined that the attribute information corresponding to the hash value calculated by the hash value calculation section 21 is not stored in the attribute information storage section 32, the data storage control section 23 controls so that divided data of data newly received from the external device 70 is stored in the divided data storage section 31. Further, when it is determined that the attribute information corresponding to the hash value calculated by the hash value calculation section 21 is not stored in the attribute information storage section 32, the data storage control section 23 controls so that attribute information of the divided data is stored in the attribute information storage section 32.

When the attribute information corresponding to the hash value calculated by the hash value calculation section 21 is stored in the attribute information storage section 32, the data storage control section 23 controls so that only identification information of the divided data is associated with the attribute information including the same hash value and stored.

Effect of the First Embodiment

As described above, according to the first embodiment, the divided data storage section 31 stores the divided data that is received from the external device 70 and divided into a predetermined size. The attribute information storage section 32 stores the attribute information in which the hash value for each divided data stored in the divided data storage section 31 is associated with the identification information to identify the original data before being divided. The hash value calculation section 21 calculates the hash value for each divided data that is received from the external device 70 and divided into a predetermined size. The determination section 22 determines whether or not attribute information corresponding to the hash value calculated by the hash value calculation section 21 is stored in the attribute information storage section 32. When it is determined that the attribute information corresponding to the hash value calculated by the hash value calculation section 21 is not stored in the attribute information storage section 32, the data storage control section 23 controls so that divided data of data newly received from the external device 70 is stored in the divided data storage section 31. Further, when it is determined that the attribute information corresponding to the hash value calculated by the hash value calculation section 21 is not stored in the attribute information storage section 32, the data storage control section 23 controls so that attribute information of the divided data is stored in the attribute information storage section 32. When the attribute information corresponding to the hash value calculated by the hash value calculation section 21 is stored in the attribute information storage section 32, the data storage control section 23 controls so that only the identification information of the divided data is associated with the attribute information including the same hash value and stored. As a result, it is possible to store only divided data that is not shared by data having been stored, and the recording volume can be reduced.

Second Embodiment

In a second embodiment, a data storage system including the archive device 10 and the external device 70 of the above described first embodiment will be described.

Configuration of Data Storage System According to the Second Embodiment

Figure 2:
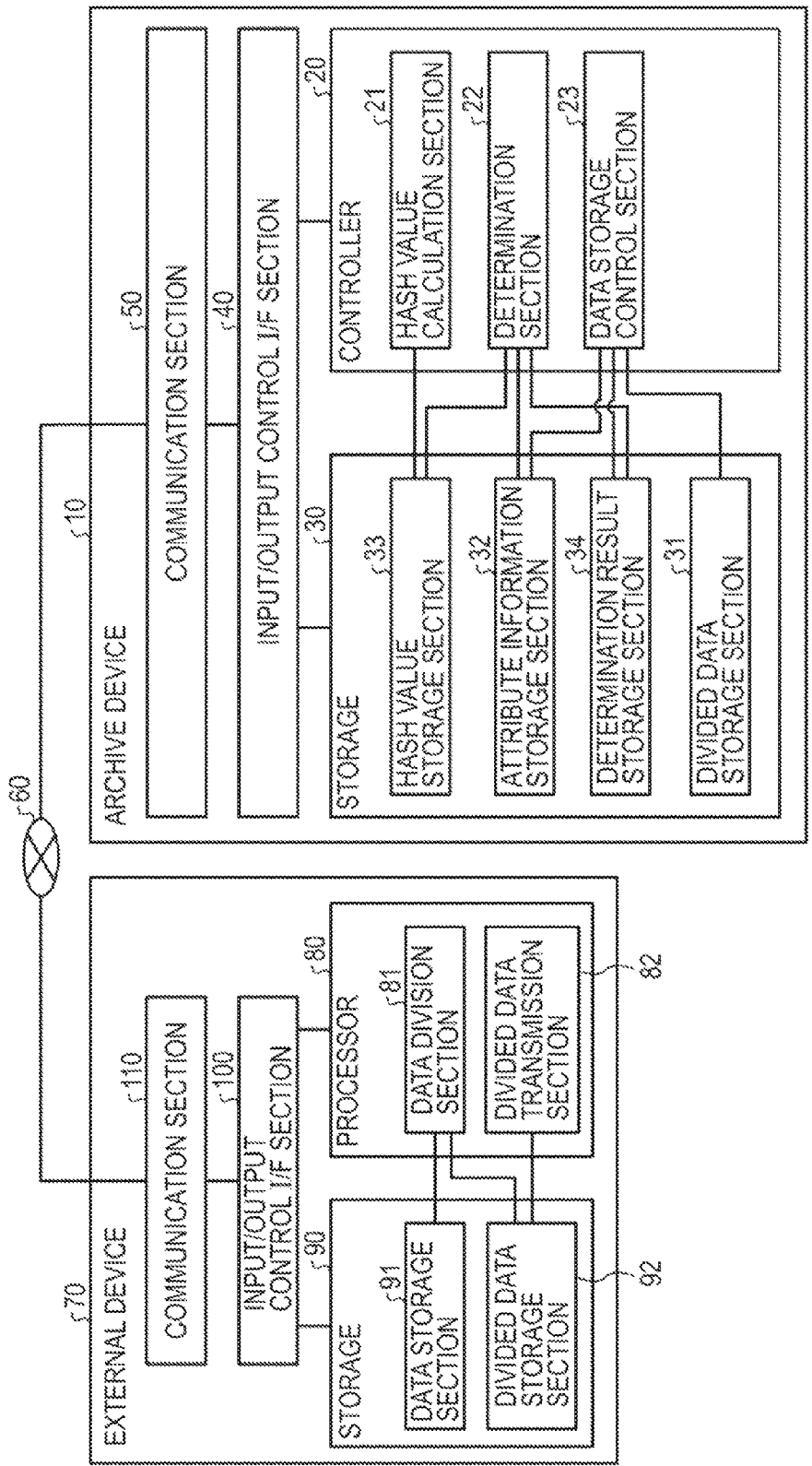
FIG. 2 is a diagram for explaining a configuration of a data storage system according to a second embodiment.
Figures 3, 4:
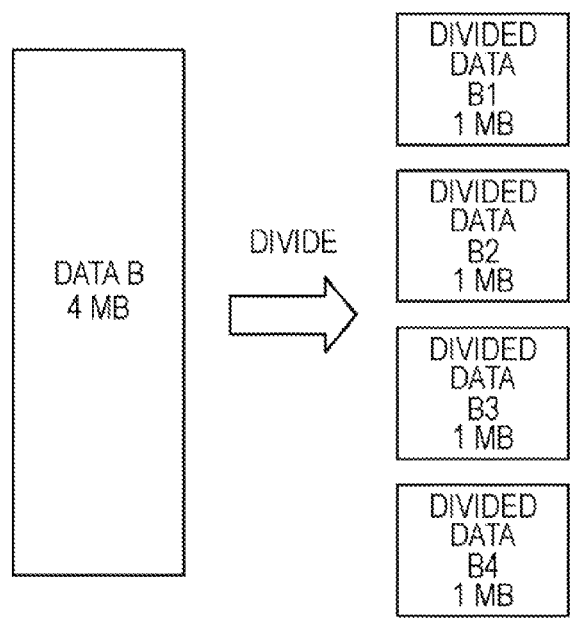
FIG. 3 is a diagram for explaining a data division section.
FIG. 4 is a diagram for explaining an attribute information storage section according to the second embodiment.
Figure 5:
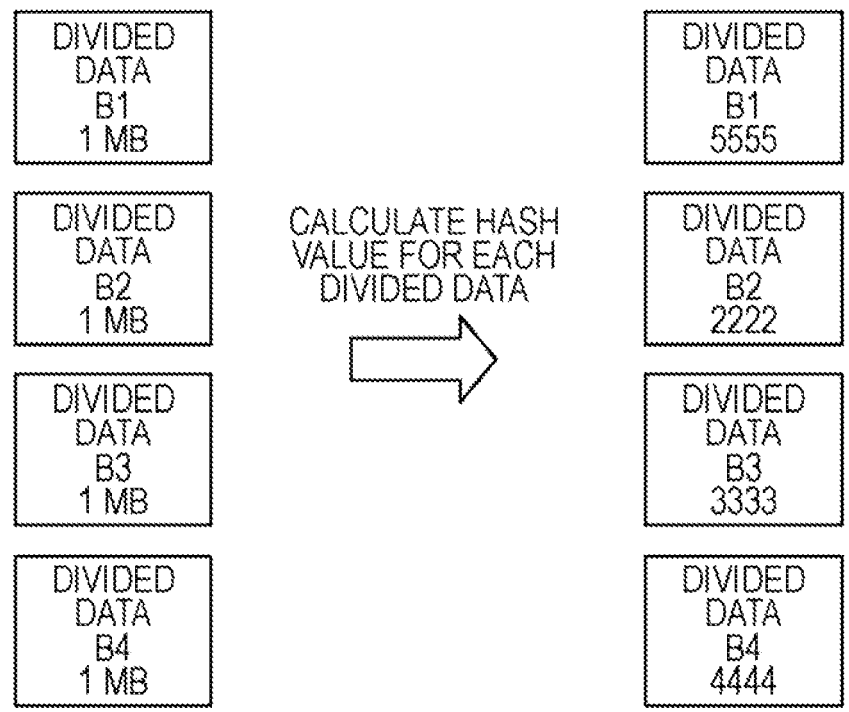
FIG. 5 is a diagram for explaining a hash value calculation section.
Figure 6B:
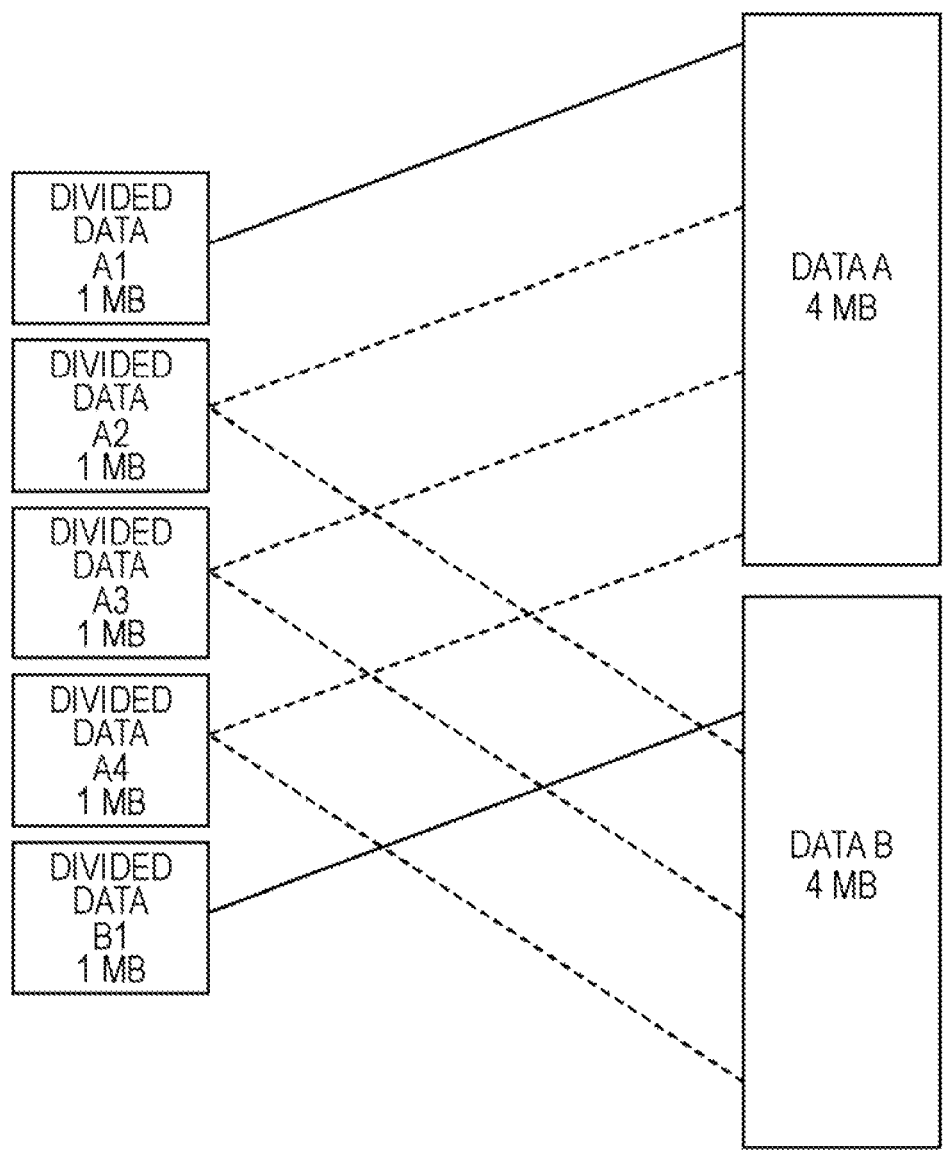

First, a configuration of the data storage system according to the second embodiment will be described with reference to FIGS. 2 to 6. FIG. 2 is a diagram for explaining the configuration of the data storage system according to the second embodiment, FIG. 3 is a diagram for explaining a data division section, and FIG. 4 is a diagram for explaining an attribute information storage section according to the second embodiment. FIG. 5 is a diagram for explaining a hash value calculation section, and FIGS. 6A and 6B are diagrams for explaining a data storage control section according to the second embodiment.

As shown in FIG. 2, the data storage system according to the second embodiment includes the archive device 10 and the external device 70, and the archive device 10 and the external device 70 are connected to each other via the network 60. Although only one external device 70 is shown in FIG. 2, actually a plurality of external devices 70 are connected to the archive device 10 via the network 60. The external device 70 is, for example, a terminal such as a business server installed in a company and a PC (personal computer) used personally by a user.

The network 60 is a communication network relaying data transmitted/received between the archive device 10 and the external device 70, and for example, the network 60 is a LAN (Local Area Network), an FC (Fibre Channel), and the like.

Hereinafter, first, a configuration of the external device 70 according to the second embodiment will be described, and then a configuration of the archive device 10 according to the second embodiment will be described.

The external device 70 according to the second embodiment issues a storage request of various digital contents (hereinafter referred to as "data") to the archive device 10, and as shown in FIG. 2, the external device 70 includes a processor 80, a storage 90, an input/output control I/F section 100, and a communication section 110.

The input/output control I/F section 100 is an interface relaying various information transmitted/received between the communication section 110 and the processor 80 and between the communication section 110 and the storage 90.

The communication section 110 performs communication with the archive device 10. The information transmitted/received to/from the archive device 10 by the communication section 110 will be described in detail below.

The storage 90 stores data that is stored in the external device 70 and a processing result of the processor 80 described below, and the storage 90 includes a data storage section 91 and a divided data storage section 92.

The data storage section 91 stores the data that is stored in the external device 70. For example, the data storage section 91 stores data of digital contents such as music, movies, e-mails, medical images, and document data.

The divided data storage section 92 stores divided data which is generated by dividing the data stored in the data storage section 91 into a predetermined size by the processor 80 described below. The divided data will be described in detail below.

The processor 80 performs various processing when the external device 70 requests the archive device 10 to store data, and the processor 80 includes a data division section 81 and a divided data transmission section 82.

When the external device 70 requests the archive device 10 to store data, the data division section 81 reads data from the data storage section 91, divides the read data into a predetermined size to generate divided data, and stores the generated divided data in the divided data storage section 92. For example, as shown in FIG. 3, the data division section 81 divides the "data B, size: 4 MB" into "1 MB" segments to generate "divided data B1, 1 MB", "divided data B2, 1 MB", "divided data B3, 1 MB", and "divided data B4, 1 MB". The "divided data B1, 1 MB" means that "the original data before being divided" is "data B" and "the serial number" of the divided data in the original data before being divided is "1".

The divided data transmission section 82 reads the divided data which is generated by the data division section 81 and stored in the divided data storage section 92, and transmits the divided data to the archive device 10 via the communication section 110. For example, the divided data transmission section 82 reads "divided data B1, 1 MB", "divided data B2, 1 MB", "divided data B3, 1 MB", and "divided data B4, 1 MB" which are stored in the divided data storage section 92, and transmits them to the archive device 10.

Next, the configuration of the archive device 10 according to the second embodiment will be described. The archive device 10 according to the second embodiment is a device that stores data received from the external device 70 connected with the archive device 10 via the network 60, and the archive device 10 includes a controller 20, a storage 30, an input/output control I/F section 40, and a communication section 50.

The input/output control I/F section 40 is an interface relaying various information transmitted/received between the communication section 50 and the controller 20 and between the communication section 50 and the storage 30.

The communication section 50 performs communication with the external device 70. The information transmitted/received to/from the external device 70 by the communication section 50 will be described in detail below.

The storage 30 stores data that is determined to be stored in the archive device 10 by the controller 20 described below and a processing result of the controller 20 described below, and the storage 30 includes a divided data storage section 31, an attribute information storage section 32, a hash value storage section 33, and a determination result storage section 34.

The divided data storage section 31 stores divided data received from the external device 70. Specifically, the divided data storage section 31 stores divided data which is determined to be stored by the controller 20 described below.

The attribute information storage section 32 stores attribute information in which a hash value for each divided data stored in the divided data storage section 31 is associated with identification information to identify the original data before being divided. Specifically, the attribute information storage section 32 associates "hash value" for each divided data archived in the divided data storage section 31 with "link destination" which is identification information to identify the original data before being divided, and stores the "hash value" and the "link destination". Further, the attribute information storage section 32 associates "archive ID" to identify divided data archived in the divided data storage section 31 with the "hash value" and the "link destination", and stores the "archive ID". Furthermore, the attribute information storage section 32 associates "storage destination path" to identify a stored position of divided data in the divided data storage section 31 and "data size" of divided data with the "hash value" and the "link destination", and stores the "storage destination path" and the "data size". Hereinafter, the information in which the "hash value", the "link destination", the "archive ID", the "storage destination path", and the "data size" are associated with each other is referred to as "attribute information".

For example, when divided data generated by dividing "4 MB" data A into "1 MB" data segments is stored in the divided data storage section 31, the attribute information storage section 32 stores attribute information described below. As shown in FIG. 4, the attribute information storage section 32 stores attribute information of "archive ID: 001", hash value: 1111, data size: 1 MB, storage destination path: /data/1, link destination: data A (1)" or the like. Also as shown in FIG. 4, the attribute information storage section 32 stores attribute information of "archive ID: 002", hash value: 2222, data size: 1 MB, storage destination path: /data/1, link destination: data A (2)" or the like. Also as shown in FIG. 4, the attribute information storage section 32 stores attribute information of "archive ID: 003", hash value: 3333, data size: 1 MB, storage destination path: /data/1, link destination: data A (3)" or the like. Also as shown in FIG. 4, the attribute information storage section 32 stores attribute information of "archive ID: 004", hash value: 4444, data size: 1 MB, storage destination path: /data/1, link destination: data A (4)" or the like. The numeral in parentheses in "link destination: data A" is a serial number to reconstruct the data A that is the original data before being divided.

The hash value storage section 33 stores the hash value calculated by the hash value calculation section 21 described below.

The determination result storage section 34 stores a determination result of the determination section 22. The content of the determination result will be described below.

The controller 20 performs various processing in accordance with a divided data storage request received from the external device 70, and the controller 20 includes a hash value calculation section 20, a determination section 21, and a data storage control section 23.

The hash value calculation section 21 calculates a hash value for each divided data newly received from the external device 70, and stores the calculated hash value in the hash value storage section 33. For example, as shown in FIG. 5, the hash value calculation section 21 calculates the hash values for each of newly received divided data B1 to B4 of "1 MB". The hash value calculation section 21 stores the calculated hash values "divided data B1: 5555", "divided data B2:

2222", "divided data B3: 3333", and "divided data B4: 4444" in the hash value storage section 33.

The determination section 22 compares the hash values stored in the hash value storage section 33 with the hash values stored in the attribute information storage section 32, determines whether or not the same hash value is stored in the attribute information storage section 32, and stores the determination result in the determination result storage section 34.

For example, when the determination section 22 refers to the attribute information shown in FIG. 4 for each of the hash values of the divided data B1 to B4 shown in FIG. 5, and determines whether or not the same hash value is stored, the determination section 22 stores the determination results as described below in the determination result storage section 34. For example, since the same hash value as that of the "divided data B1: 5555" is not stored, the determination section 22 stores a determination result of "divided data B1: 5555, the same hash value: absent" in the determination result storage section 34.

On the other hand, since the "divided data B2: 2222" has the same hash value as that of "archive ID: 002", the determination section 22 stores a determination result of "divided data B2: 2222, the same hash value: (archive ID: 002)" in the determination result storage section 34. In the same way, the determination section 22 stores a determination result of "divided data B3: 3333, the same hash value: (archive ID: 003)" for the "divided data B3" in the determination result storage section 34. The determination section 22 stores a determination result of "divided data B4: 4444, the same hash value: (archive ID: 004)" for the "divided data B4" in the determination result storage section 34.

When the attribute information corresponding to the hash value calculated by the hash value calculation section 21 is not stored in the attribute information storage section 32, the data storage control section 23 controls so that divided data newly received from the external device 70 is stored in the divided data storage section 31. Specifically, when the determination result of "the same hash value: absent" is stored in the determination result storage section 34, the data storage control section 23 controls so that the divided data corresponding to the determination result is stored in the divided data storage section 31.

For example, since the "divided data B1: 5555, the same hash value: absent" is stored in the determination result storage section 34, the data storage control section 23 stores the divided data B1 in the divided data storage section 31.

Further, when the attribute information corresponding to the hash value calculated by the hash value calculation section 21 is not stored in the attribute information storage section 32, the data storage control section 23 controls so that attribute information of the divided data is stored in the attribute information storage section 32. Specifically, when the determination result of "the same hash value: absent" is stored in the determination result storage section 34, the data storage control section 23 controls so that the attribute information of the divided data corresponding to the determination result is stored in the attribute information storage section 32.

For example, since the "divided data B1: 5555, the same hash value: absent" is stored in the determination result storage section 34, the data storage control section 23 controls so that the attribute information of "archive ID: 005" shown in FIG. 6A is stored in the attribute information storage section 32. Specifically, as shown in FIGS. 6A and 6B, the data storage control section 23 controls so that the attribute information "archive ID: 005", hash value: 5555, data size: 1 MB, storage destination path: /data/2, link destination: data B (1)" is stored in the attribute information storage section 32. Thus, the controller 20 writes information indicating that a plurality of the original data includes a plurality of common divided data to the storage 30, respectively.

When the attribute information corresponding to the hash value calculated by the hash value calculation section 21 is stored in the attribute information storage section 32, the data storage control section 23 controls so that only the identification information of the divided data is associated with the attribute information including the same hash value and stored. Specifically, when the determination result indicating that there is the same hash value in the determination result storage section 34, the data storage control section 23 controls so that information of the original data before the divided data is divided is associated with the attribute information including the same hash value and stored.

For example, since the "divided data B2: 2222, the same hash value: (archive ID: 002)" is stored in the determination result storage section 34, the data storage control section 23 controls so that the attribute information is stored as shown in FIG. 6A. Specifically, as shown in FIG. 6A, the data storage control section 23 controls so that the "data B (2)" is further associated with the "link destination" of the "archive ID: 002" and stored.

In the same way, as shown in FIG. 6A, the data storage control section 23 controls so that the "data B (3)" and the "data B (4)" are further associated with the "link destination" of the "archive ID: 003" and the "archive ID: 004" respectively and stored.

In other words, the data storage control section 23 according to the second embodiment stores a single piece of divided data which is shared by a plurality of original data before being divided, and controls the data storage so that the single piece of divided data can be shared by the plurality of original data. For example, as shown by the dotted lines in FIG. 6B, the data storage control section 23 controls the data storage processing so that the divided data A2 to the divided data A4 are shared by the data A and the data B. For example, as shown by the solid lines in FIG. 6B, the data storage control section 23 controls so that the divided data having a one-on-one relationship with the original data before being divided is stored independently.

The data storage control section 23 controls so that the archive ID of the newly received divided data is transmitted to the external device 70 from which the divided data is received. Specifically, when the data storage control section 23 controls so that the newly received divided data is stored in the divided data storage section 31, the data storage control section 23 controls so that the archive ID provided to the divided data is transmitted to the external device 70. When the data storage control section 23 controls so that only the identification information is associated with the attribute information and stored, the data storage control section 23 controls so that the archive ID of the attribute information with which the identification information is associated is transmitted to the external device 70.

Processing Procedure of Data Storage System According to the Second Embodiment

Figure 8:
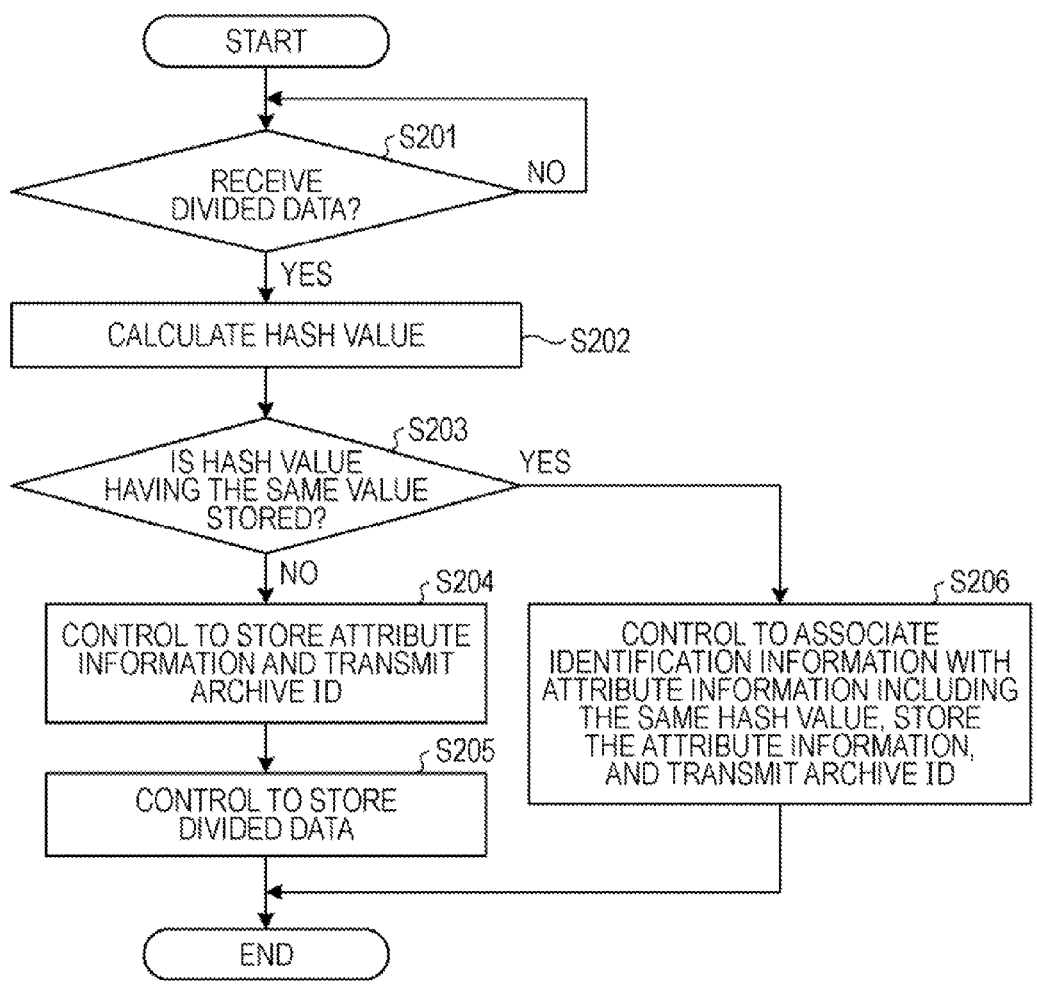
FIG. 8 is a diagram for explaining a processing procedure of an archive device according to a second embodiment.

Next, processing of the data storage system according to the second embodiment will be described with reference to FIGS. 7 and 8. FIG. 7 is a diagram for explaining the processing procedure of the external device according to the second embodiment, and FIG. 8 is a diagram for explaining a processing procedure of the archive device according to the second embodiment.

Processing Procedure of the External Device
According to the Second Embodiment

As shown in FIG. 7, first, when the external device 70 according to the second embodiment receives a storage command (S101: Yes), the data division section 81 reads data requested to be stored from the data storage section 91 (S102).

Then, the data division section 81 divides the data read from the data storage section 91 into a predetermined size (S103). Specifically, the data division section 81 divides the read data into the predetermined size, and stores the divided data in the divided data storage section 92.

Thereafter, the divided data transmission section 82 reads the divided data from the divided data storage section 92 and transmits the read divided data to the archive device 10 (S104).

When receiving the archive ID from the archive device 10 (S105: Yes), the external device 70 stores the received archive ID (S106) and ends the processing.

Processing Procedure of the Archive Device
According to the Second Embodiment

As shown in FIG. 8, first, when the archive device 10 according to the second embodiment receives the divided data from the external device 70 (S201: Yes), the hash value calculation section 21 calculates a hash value of the received divided data (S202). Specifically, the hash value calculation section 21 calculates the hash value of the received divided data, and stores the calculated hash value in the hash value storage section 33.

The determination section 22 determines whether or not the attribute information including the same hash value as that stored in the hash value storage section 33 is stored in the attribute information storage section 32 (S203).

When the same hash value is not stored (S203: No), the data storage control section 23 stores the attribute information of the divided data in the attribute information storage section 32, and controls so that the archive ID is transmitted to the external device 70 (S204).

The data storage control section 23 controls so that the divided data received from the external device 70 is stored in the divided data storage section 31 (S205), and ends the processing.

On the other hand, when the same hash value is stored (S203: Yes), the data storage control section 23 associates only the identification information with the attribute information including the same hash value, and controls so that the associated archive ID is transmitted to the external device 70 (S206), and ends the processing.

Effect of the Second Embodiment

As described above, according to the second embodiment, the divided data storage section 31 stores the divided data that is received from the external device 70 and divided into a predetermined size. The attribute information storage section 32 stores the attribute information in which the hash value for each divided data stored in the divided data storage section 31 is associated with the identification information to identify the original data before being divided. The hash value calculation section 21 calculates the hash values for each divided data that is received from the external device 70 and divided into a predetermined size. The determination section 22 determines whether or not attribute information corresponding to the hash value calculated by the hash value calculation section 21 is stored in the attribute information storage section 32. When it is determined that the attribute information corresponding to the hash value calculated by the hash value calculation section 21 is not stored in the attribute information storage section 32, the data storage control section 23 controls so that divided data of data newly received from the external device 70 is stored in the divided data storage section 31. Further, when it is determined that the attribute information corresponding to the hash value calculated by the hash value calculation section 21 is not stored in the attribute information storage section 32, the data storage control section 23 controls so that attribute information of the divided data is stored in the attribute information storage section 32. When the attribute information corresponding to the hash value calculated by the hash value calculation section 21 is stored in the attribute information storage section 32, the data storage control section 23 controls so that only the identification information of the divided data is associated with the attribute information including the same hash value and stored. As a result, data is managed by the divided data that is divided into a predetermined size, and thus it is possible to control so that the same divided data is stored to be shared by a plurality of data without having redundant divided data, and reduce the recording volume.

Third Embodiment

While, in the first and the second embodiments, a case is described in which each of the divided data stored in the divided data storage section 31 is managed individually, in a third embodiment, a case will be described in which a plurality of divided data that are divided from a plurality of the same original data are integrally managed.

Configuration of Data Storage System According to
the Third Embodiment

Figure 9:
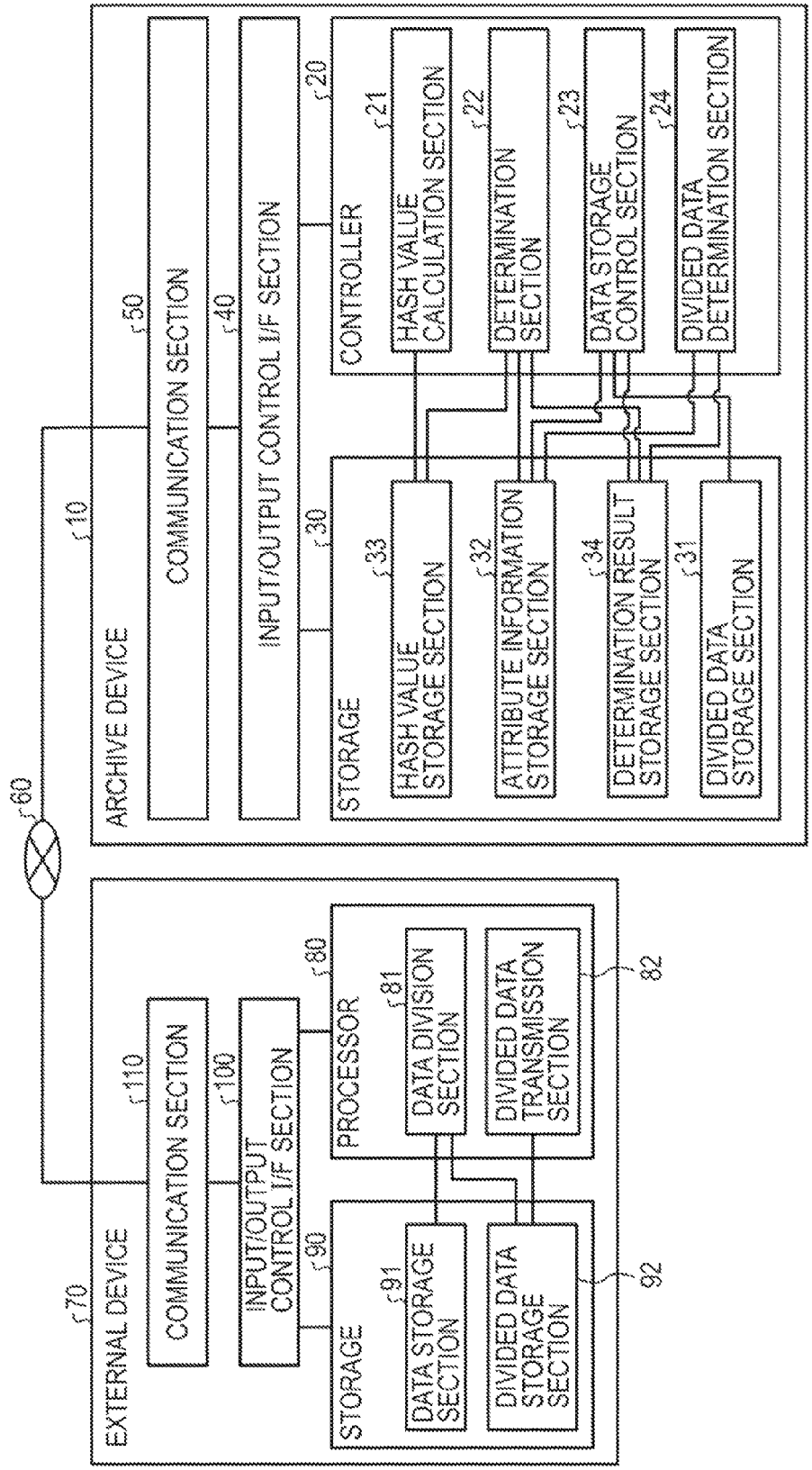
FIG. 9 is a diagram for explaining a configuration of a data storage system according to a third embodiment.
Figure 10A:
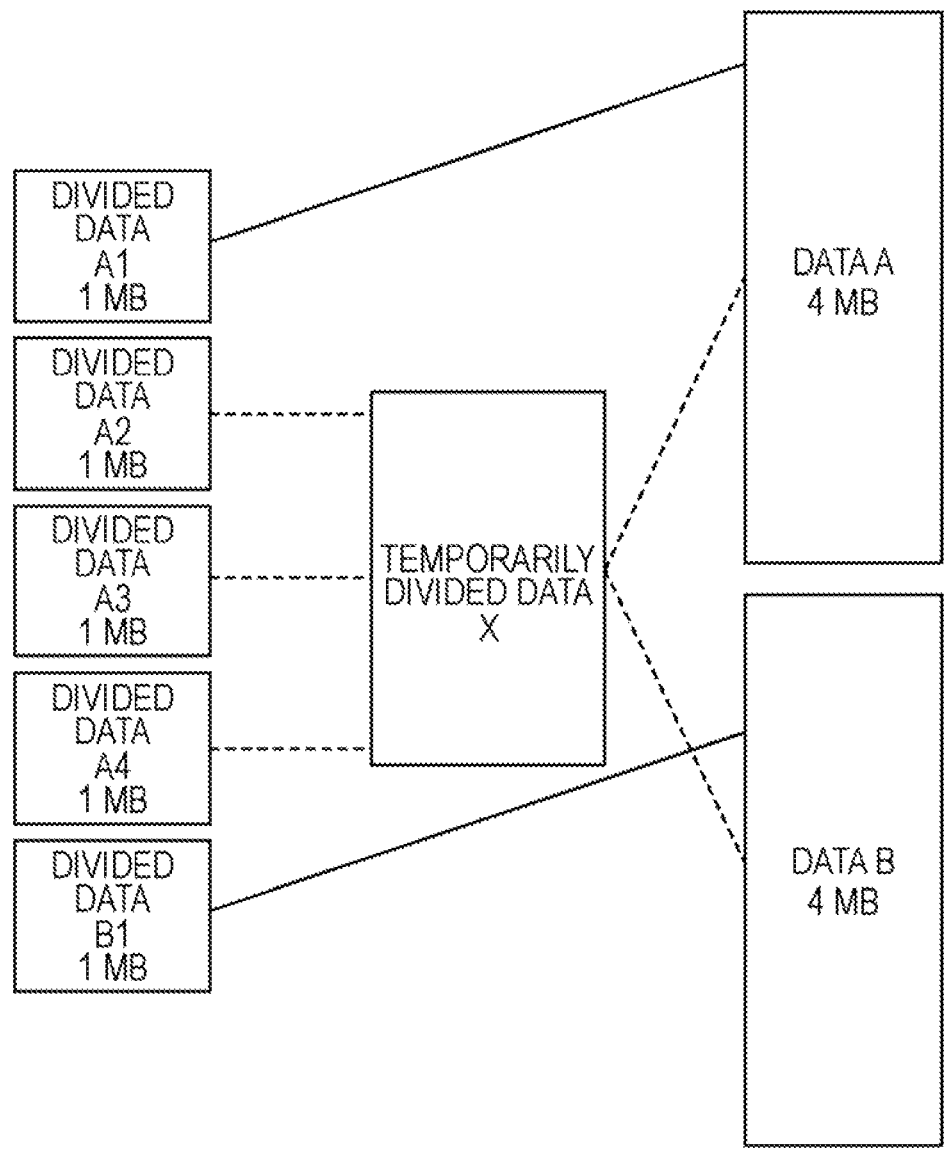

First, a configuration of the data storage system according to the third embodiment will be described with reference to FIGS. 9 and 10. FIG. 9 is a diagram for explaining a configuration of the data storage system according to the third embodiment, and FIGS. 10A, 10B, and 10C are diagrams for explaining the data storage control section according to the third embodiment.

As shown in FIG. 9, the data storage system according to the third embodiment is different from the data storage system according to the second embodiment in that the archive device 10 additionally includes a divided data determination section 24. In addition, in the data storage system according to the third embodiment, the content stored in the determination result storage section 34 and the content of the processing performed by the data storage control section 23 are different from those of the second embodiment. Hereinafter, these different points will be mainly described.

The divided data determination section 24 determines whether or not a plurality of divided data are respectively divided from a plurality of the same original data. Specifically, the divided data determination section 24 refers to the attribute information in the attribute information storage section 32, and determines whether or not there are a plurality of divided data whose attribute information indicate that a plurality of original data are stored in the link destination and the original data are shared by the plurality of divided data. For example, the divided data determination section 24 refers to FIG. 6A, and determines that the "archive ID: 002", the "archive ID: 003", and the "archive ID: 004" are linked to the "data A" and the "data B".

Then, the divided data determination section 24 stores the determination result in the determination result storage section 34. For example, the divided data determination section 24 stores the determination result of "archive ID: 002, 003, and 004" in the determination result storage section 34.

When the divided data determination section 24 determines that a plurality of divided data are respectively divided from a plurality of the same original data, the data storage control section 23 determines that the plurality of divided data are a single temporarily divided data. Then, the data storage control section 23 controls so that the identification information of the plurality of divided data that form the temporarily divided data is replaced by the identification information of the temporarily divided data, and stored in the attribute information storage section 32.

For example, since the "archive ID: 002, 003, and 004" is stored in the determination result storage section 34, the data storage control section 23 determines that the "divided data A2 to divided data A4" are "temporarily divided data: X" as shown in FIG. 10A. Then, the data storage control section 23 controls so that the link destinations "data A" and "data B" of the "archive ID: 002, 003, and 004" are replaced by the link destination "temporarily divided data: X", and stored in the attribute information storage section 32. Specifically, as shown in FIG. 10B, the data storage control section 23 changes stored attribute information to "archive ID: 002", hash value: 2222, data size: 1 MB, storage destination path: /data/1, link destination: X". Also, as shown in FIG. 10B, the data storage control section 23 changes stored attribute information to "archive ID: 003", hash value: 3333, data size: 1 MB, storage destination path: /data/1, link destination: X". Also, as shown in FIG. 10B, the data storage control section 23 changes stored attribute information to "archive ID: 004", hash value: 4444, data size: 1 MB, storage destination path: /data/1, link destination: X".

Then, as shown in FIG. 10C, the data storage control section 23 controls so that "temporarily divided data: X, link destination: data A (2 to 4), link destination: data B (2 to 4)" is additionally stored in the attribute information storage section 32.

The divided data that does not form the temporarily divided data is stored without change. For example, "divided data A1" linked to the original data before being divided on one-on-one basis as shown in FIG. 10A is stored as shown in FIG. 10B. Specifically, the "divided data A1" is stored as "archive ID: 001", hash value: 1111, data size: 1 MB, storage destination path: /data/1, link destination: data A (1)". Also, the "divided data B1" shown in FIG. 10A is stored as "archive ID: 005", hash value: 5555, data size: 1 MB, storage destination path: /data/2, link destination: data B (1)" as shown in FIG. 10B.

Figure 11:
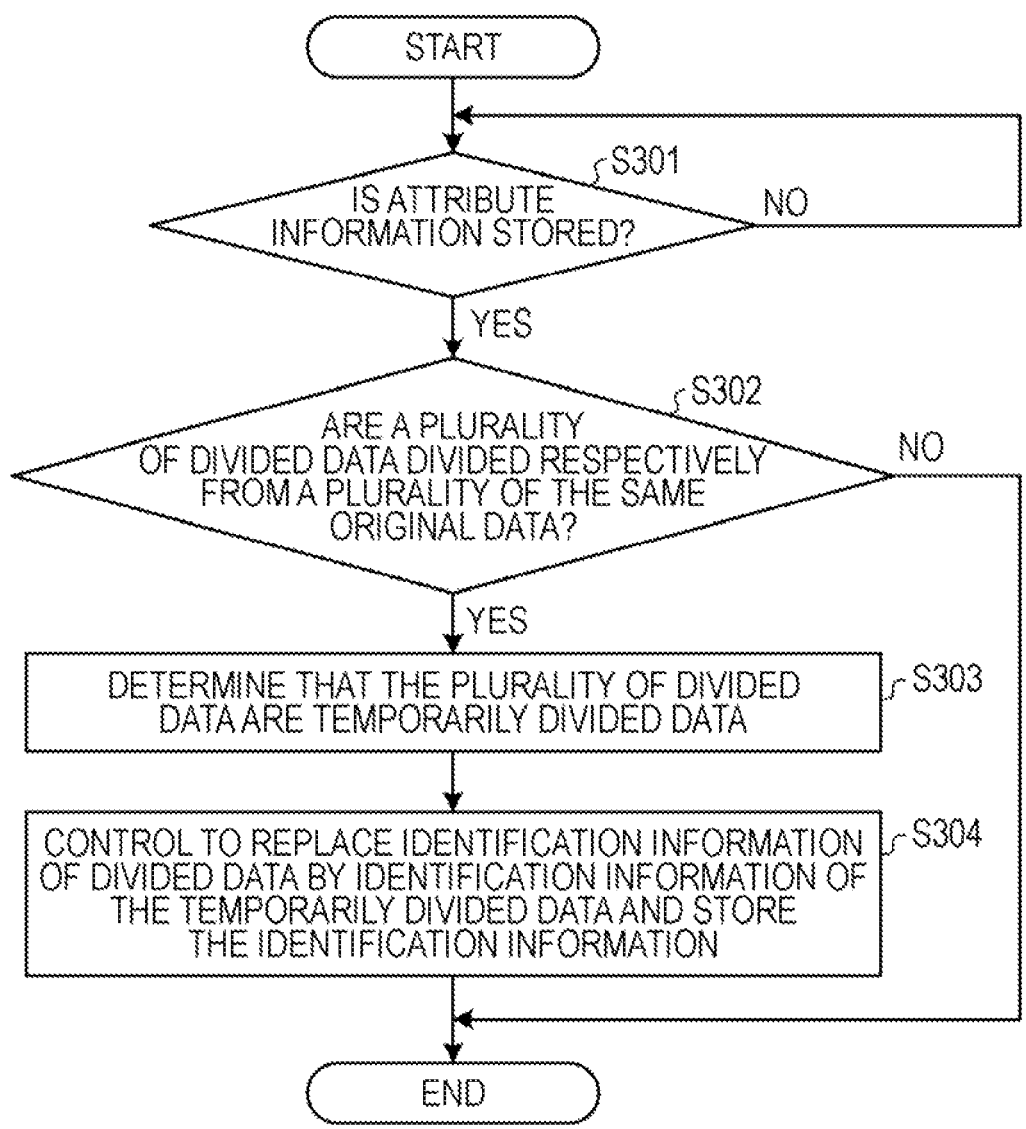
FIG. 11 is a diagram for explaining a procedure of determination processing of temporarily divided data according to the third embodiment.

Procedure of Determination Processing of the Temporarily Divided Data According to the Third Embodiment Next, a procedure of determination processing of the temporarily divided data according to the third embodiment will be described with reference to FIG. 11. FIG. 11 is a diagram for explaining the procedure of determination processing of the temporarily divided data according to the third embodiment. Since the processing procedure of the data storage by the external device 70 and the archive device 10 according to the third embodiment is the same as the processing procedure described in the second embodiment, the description thereof will be omitted.

As shown in FIG. 11, first, in the archive device 10 according to the third embodiment, when the attribute information is stored (S301: Yes), the divided data determination section 24 determines whether a plurality of divided data are respectively divided from a plurality of the same original data (S302). Specifically, the divided data determination section 24 refers to the attribute information in the attribute information storage section 32, and determines whether or not there are a plurality of divided data whose attribute information indicate that a plurality of original data are stored in the link destination and the original data are shared by the plurality of divided data.

When a plurality of divided data are respectively divided from a plurality of the same original data (S302: Yes), the data storage control section 23 determines that the plurality of divided data are the temporarily divided data (S303).

Then, the data storage control section 23 controls so that the identification information of the divided data is replaced by the identification information of the temporarily divided data and stored in the attribute information storage section 32 (S304), and ends the processing.

On the other hand, when a plurality of divided data are not divided respectively from a plurality of the same original data (S302: No), the archive device 10 according to the third embodiment ends the processing.

Effect of the Third Embodiment

As described above, according to the third embodiment, the divided data determination section 24 determines whether or not a plurality of divided data are respectively divided from a plurality of the same original data. When the divided data determination section 24 determines that a plurality of divided data are divided respectively from a plurality of the same original data, the data storage control section 23 determines that the plurality of divided data are a single temporarily divided data. Then, the data storage control section 23 replaces the identification information of the plurality of divided data that form the temporarily divided data by the identification information of the temporarily divided data, and stores the identification information in the attribute information storage section 32. As a result, the data storage system according to the third embodiment can integrate the link destination information stored for each divided data into a single information item as a link destination of the temporarily divided data, and hence it is possible to reduce the recording volume.

Fourth Embodiment

While, in the first to the third embodiments, a case is described in which the divided data is managed by the size into which the original data is divided in the external device 70, in a fourth embodiment, a case will be described in which the divided data managed by the archive device 10 are combined.

Configuration of Data Storage System According to the Fourth Embodiment

First, a configuration of the data storage system according to the fourth embodiment will be described with reference to FIGS. 9 and 12. FIG. 9 is a diagram for explaining a configuration of the data storage system according to the fourth embodiment, and FIGS. 12A and 12B are diagrams for explaining the data storage control section according to the fourth embodiment.

Although the data storage system according to the fourth embodiment includes the same functional blocks as those of the third embodiment as shown in FIG. 9, the contents stored in the divided data storage section 31 and the attribute information storage section 32 are different from those of the data storage system according to the second and the third embodiments. In addition, in the data storage system according to the fourth embodiment, the contents of processing performed by the data storage control section 23 and the determination section 22 are different from those of the data storage system according to the second and the third embodiments. Hereinafter, these different points will be mainly described.

When the number of the original data before being divided of the temporarily divided data exceeds a predetermined threshold value, the data storage control section 23 controls so that combined divided data in which a plurality of the divided data forming the temporarily divided data are combined is stored in the divided data storage section 31. For example, it is assumed that the predetermined threshold value is "3", and "data C (2 to 4)" is newly added to the link destination of the "temporarily divided data: X" shown in FIG. 10C. In this case, the data storage control section 23 controls so that "combined divided data X" in which the divided data "A2", "A3", and "A4" that form the "temporarily divided data: X" are combined is generated and the generated "combined divided data X" is stored in the divided data storage section 31.

Then, the data storage control section 23 controls so that the divided data forming the combined divided data are deleted from the divided data storage section 31 and the attribute information of the deleted divided data is deleted from the attribute information storage section 32. For example, the data storage control section 23 controls so that the divided data "A2", "A3", and "A4" are deleted from the divided data storage section 31 and the attribute information of the divided data "A2", "A3", and "A4" is deleted from the attribute information storage section 32.

When the data storage control section 23 controls so that the combined divided data is stored in the divided data storage section 31, the data storage control section 23 controls so that the attribute information described below is stored in the attribute information storage section 32 as the attribute information of the combined divided data. Specifically, the data storage control section 23 controls so that the attribute information in which the hash value of the combined divided data, the identification information, and the hash values of each divided data forming the combined divided data are associated with each other is stored in the attribute information storage section 32.

For example, as shown in FIG. 12A, the data storage control section 23 controls so that "hash value", "data size: 3 MB", "storage destination path: /data/1", and "link destination" are associate with "archive ID: 006" of the "combined divided data X", and stored. Here, the data storage control section 23 controls so that "hash value: 6666" of the "combined divided data X" and the hash values of each divided data forming the "combined divided data X" are associated with the attribute information as "hash values", and stored in the attribute information storage section 32. For example, when forming the "combined divided data X", the data storage control section 23 controls so that the "hash value: 2222" of the "divided data A2" that is the top data is associated with the "hash value" of the "archive ID: 006", and stored (refer to FIG. 12A).

Also, the data storage control section 23 controls so that information of the original data before being divided of the "combined divided data X" is associated with the attribute information as "link destinations", and stored in the attribute information storage section 32. For example, as shown in FIG. 12A, the data storage control section 23 controls so that "data A (2 to 4)", "data B (2 to 4)", and "data C (2 to 4)" are stored as "link destinations" of the "archive ID: 006".

Figure 12B:
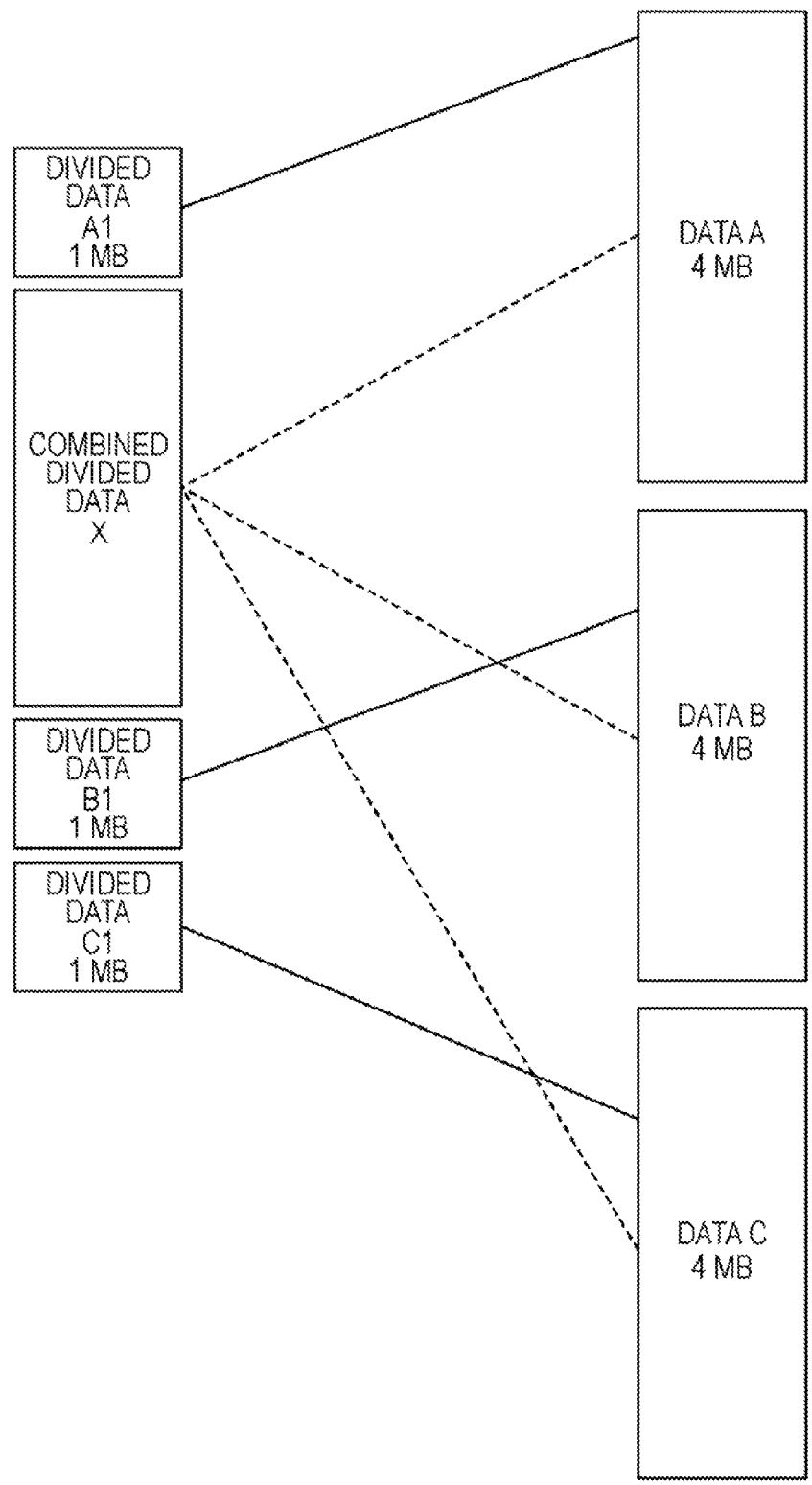

In other words, when the number of the original data of the temporarily divided data exceeds the predetermined threshold value, as shown in FIG. 12B, the data storage control section 23 controls so that the "combined divided data X" is linked to the "data A", "data B", and "data C" which are the original data, and managed.

The divided data that does not form the combined divided data is stored without change. For example, "divided data A1" linked to the original data on one-on-one basis as shown in FIG. 12B is stored as shown in FIG. 12A. Specifically, the "divided data A1" is stored as "archive ID: 001", hash value: 1111, data size: 1 MB, storage destination path: /data/1, link destination: data A (1)". Also, the "divided data B1" shown in FIG. 12B is stored as "archive ID: 005", hash value: 5555, data size: 1 MB, storage destination path: /data/2, link destination: data B (1)" as shown in FIG. 12A. Also, the "divided data C1" shown in FIG. 12B is stored as "archive ID: 007", hash value: 7777, data size: 1 MB, storage destination path: /data/3, link destination: data C (1)" as shown in FIG. 12A.

When the determination section 22 determines newly received data by using the attribute information of the combined divided data, if the hash value of the divided data included in the attribute information is the same as the hash value of the newly received data, the determination section 22 determines the newly received data by using the hash value of the combined divided data. Specifically, when the determination section 22 determines newly received divided data, the determination section 22 compares the hash value included in the attribute information of the combined divided data with the hash value of the newly received divided data, and determines the newly received divided data. When the compared hash values are the same, the determination section 22 performs the determination by comparing the hash value of the combined divided data with the hash value of divided data in which the newly received divided data and divided data following the newly received divided data are added to form divided data having the same size as that of the combined divided data.

For example, when the determination section 22 performs the determination by using the attribute information of the "archive: 006" shown in FIG. 12A, first, the determination section 22 compares the hash value of newly received "1 MB" divided data with the "archive: 006, hash value: 2222". When the hash value of the newly received divided data is "2222", the determination section 22 performs the determination by using the hash value of divided data of "3 MB" that is the size of the combined divided data. Specifically, the determination section 22 compares the hash value calculated from "3 MB" data in which the received "1 MB" divided data and "2 MB" divided data following the received "1 MB" divided data are added with the hash value "6666" of the "3 MB" combined divided data, and performs determination.

Although, in above example, a case in which there is only one hash value of divided data is described, this embodiment is not limited to this, and there may be hash values of a plurality of divided data.

Processing Procedure of the Archive Device
According to the Fourth Embodiment

Next, processing of the archive device according to the fourth embodiment will be described with reference to FIG. 13. FIG. 13 is a diagram for explaining a processing procedure of the archive device according to the fourth embodiment. Since the processing procedure of the external device according to the fourth embodiment is the same as that of the external device according to the second embodiment, the description thereof will be omitted. Also, since steps S405 to S409 and step S411 shown in FIG. 13 are the same as steps S201 to S205 and step S206 shown in FIG. 8 respectively, the descriptions thereof will be omitted.

As shown in FIG. 13, in the archive device 10 according to the fourth embodiment, when the number of original data before being divided is greater than or equal to a threshold value (S401: Yes), the data storage control section 23 controls so that combined divided data is generated and stored in the divided data storage section 31 (S402). Specifically, the data storage control section 23 controls so that the divided data forming the temporarily divided data are combined to generate the combined divided data, and the generated combined divided data is stored in the divided data storage section 31.

The data storage control section 23 controls so that attribute information of the generated combined divided data is generated and stored in the attribute information storage section 32 (S403). Specifically, the data storage control section 23 controls so that the attribute information in which the hash value of the combined divided data, the identification information, and the hash values of each divided data forming the combined divided data are associated with each other is generated and stored in the attribute information storage section 32.

Then, the data storage control section 23 controls so that the divided data forming the combined divided data is deleted from the divided data storage section 31 and the attribute information of the divided data is deleted from the attribute information storage section 32 (S404). Hereinafter, processing content performed by the archive device 10 according to the fourth embodiment in addition to the processing content described in the second embodiment when new divided data is received after the combined divided data is formed will be described.

When the same hash value as the hash value of the newly received divided data is stored (S407: Yes), the determination section 22 determines whether or not the same hash value is the hash value of the divide data included in the combined divided data (S410). Specifically, the determination section 22 of the archive device 10 according to the fourth embodiment determines whether or not the hash value of the newly received divided data is the same as the hash value of the divided data included in the attribute information of the combined divided data.

When the same hash value is the hash value of the divided data included in the combined divided data (S410: Yes), the hash value calculation section 21 calculates a hash value of divided data having the same size as that of the combined divided data (S412). Specifically, the hash value calculation section 21 calculates a hash value of divided data in which divided data following the divided data that is determined that the same hash value has been stored is added to the divided data so that the divided data has the same size as that of the combined divided data. Then, the determination section 22 performs the determination in step S407 again.

On the other hand, when the same hash value is not the hash value of the divided data included in the combined divided data (S410: No), the data storage control section 23 performs the storage processing control in step S411, and them ends the processing.

Effect of the Fourth Embodiment

As described above, according to the fourth embodiment, when the number of the original data before being divided of the temporarily divided data exceeds a predetermined threshold value, the data storage control section 23 controls so that the combined divided data in which a plurality of the divided data forming the temporarily divided data are combined is stored in the divided data storage section. The data storage control section 23 controls so that the divided data forming the combined divided data are deleted from the divided data storage section 31 and the attribute information of the divided data is deleted from the attribute information storage section 32. When the data storage control section 23 controls so that the combined divided data is stored in the divided data storage section 31, the data storage control section 23 controls so that the attribute information is updated to be associated with the hash value of the combined divided data, identification information, and the hash values of each divided data forming the combined divided data. When the determination section 22 determines newly received data by using the attribute information of the combined divided data, if the hash value of the divided data included in the attribute information is the same as the hash value of the newly received data, the determination section 22 determines the newly received data by using the hash value of the combined divided data. As a result, the data storage system according to the fourth embodiment can delete the attribute information stored for each divided data by managing the divided data as the combined divided data, and thus it is possible to reduce the recording volume.

The data storage system according to the fourth embodiment can smoothly determine whether or not the newly received data overlaps the combined divided data, and when the newly received data overlaps the combined divided data, the combined divided data having been stored can be shared, so that the recording volume can be further reduced.

Fifth Embodiment

While, in the first to the fourth embodiments, a case is described in which the divided data is formed by dividing the original data into a predetermined size, in a fifth embodiment, a case will be described in which the size into which the original data is divided is properly changed on the basis of the size of the divided data stored in the divided data storage section 31.

Configuration of Data Storage System According to the Fifth Embodiment

Figure 14:
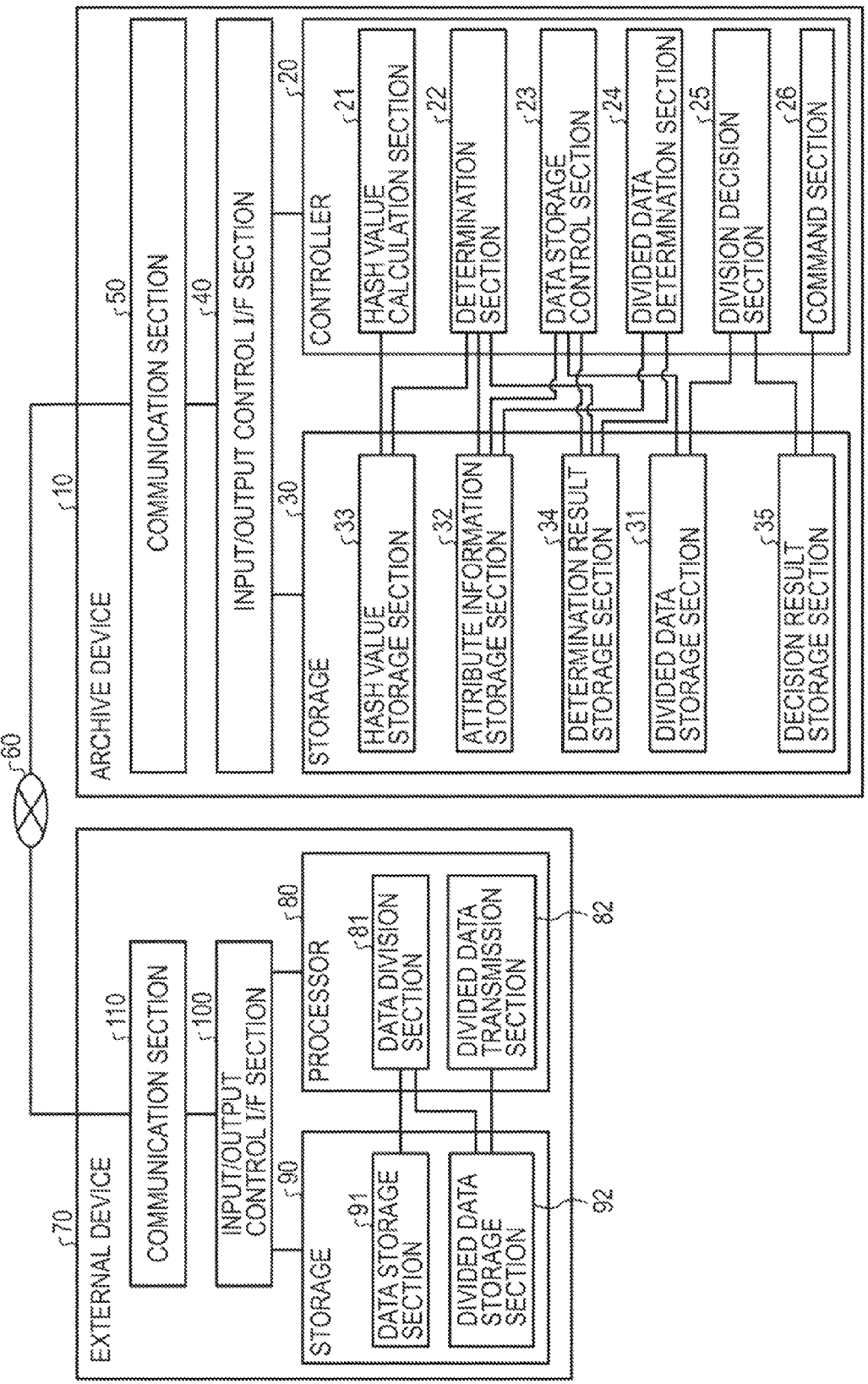
FIG. 14 is a diagram for explaining a configuration of a data storage system according to a fifth embodiment.

First, a configuration of the data storage system according to the fifth embodiment will be described with reference to FIG. 14. FIG. 14 is a diagram illustrating the configuration of the data storage system according to the fifth embodiment.

As shown in FIG. 14, the data storage system according to the fifth embodiment is different from the data storage system according to the second to the fourth embodiments in that the archive device 10 additionally includes a decision result storage section 35, a division decision section 25, and a command section 26. Hereinafter, these different points will be mainly described.

The decision result storage section 35 stores a decision result decided by the division decision section 25 described below. The decision result will be described below.

The division decision section 25 decides a predetermined size into which data is divided on the basis of each size of divided data stored in the divided data storage section 31. Specifically, the division decision section 25 decides so that data is divided into the same size as the minimum size of the sizes of the divided data stored in the divided data storage section 31, and stores the decision result in the decision result storage section 35. For example, when the minimum size of the sizes of the divided data stored in the divided data storage section 31 is "3 MB", the division decision section 25 decides that newly stored data is divided into "3 MB", and stores the decided "3 MB" in the decision result storage section 35.

The command section 26 commands the external device 70 to transmit data by the predetermined size decided by the division decision section 25. For example, since the "3 MB" is stored in the determination result storage section 35, the command section 26 commands the external device 70 to transmit data by dividing the data into divided data of "3 MB".

Figure 15:
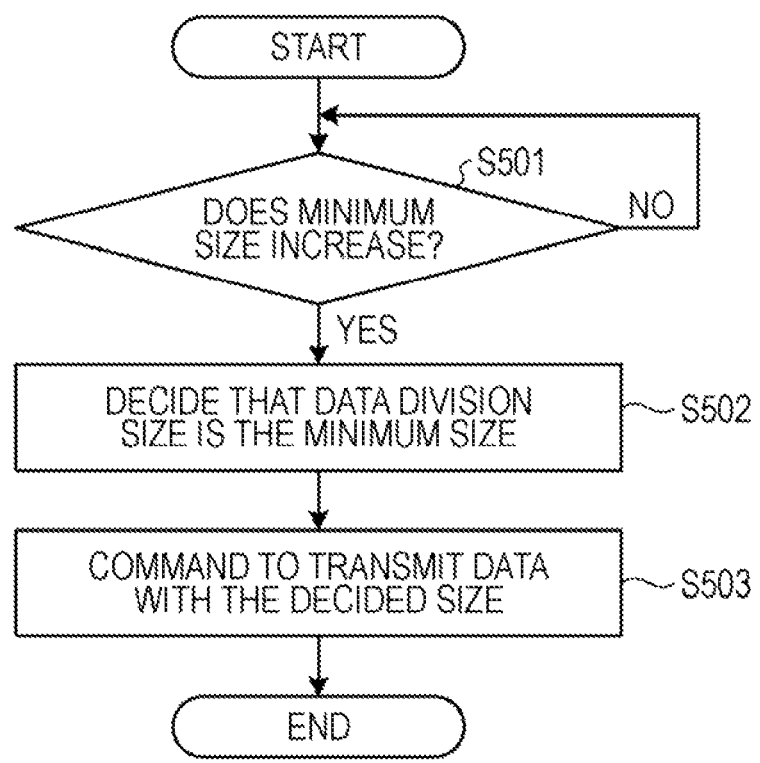
FIG. 15 is a diagram for explaining a procedure of divided data size decision processing according to the fifth embodiment.

Procedure of Divided Data Size Decision Processing Data According to the Fifth Embodiment Next, the divided data size decision processing according to the fifth embodiment will be described with reference to FIG. 15. FIG. 15 is a diagram for explaining the procedure of divided data size decision processing according to the fifth embodiment. Since various processing related to data storage by the external device and the archive device according to the fifth embodiment is the same as that of the external device and the archive device according to the second to the fourth embodiments, the description thereof will be omitted.

As shown in FIG. 15, in the archive device 10 according to the fifth embodiment, when the minimum size of the divided data stored in the divided data storage section 31 increases (S501: Yes), the division decision section 25 decides that the data division size is the minimum size (S502).

The controller 20 notifies the predetermined size to the external device 70, the predetermined size being decided in accordance with the divided data stored in the storage 30. The command section 26 commands the external device 70 to transmit data by the predetermined size decided by the division decision section 25 (S503).

Effect of the Fifth Embodiment

As described above, according to the fifth embodiment, the division decision section 25 decides a predetermined size into which data is divided on the basis of each size of divided data stored in the divided data storage section 31. The command section 26 commands the external device 70 to transmit data by the predetermined size decided by the division decision section 25. As a result, the data storage system according to the fifth embodiment can store data by a data size suitable for the use environment of the data storage system by appropriately changing the size of data to be stored, and hence it is possible to further reduce the recording volume.

Sixth Embodiment

While the first to the fifth embodiments have been described, various different embodiments may be implemented other than the first to the fifth embodiments described above. Therefore, hereinafter, various different embodiments (1) to (3) will be described.

(1) Dividing Data

Although, in the first to the fifth embodiments described above, a case in which data is divided in the external device 70 is described, this embodiment is not limited to this, and for example, data received from the external device 70 may be divided in the archive device 10.

(2) System Configuration or the Like

The processing procedures, specific names, and information including various data and parameters described in the above embodiments can be arbitrarily changed unless otherwise stated. For example, in this embodiment, the threshold value used when the divided data are combined to be the combined divided data can be arbitrarily set.

The constituent elements of the devices shown in the drawings are functionally conceptual, and need not necessarily be physically identical to the constituent elements shown in the drawings. In other words, specific forms of distribution and integration of the processing sections and the storage sections (for example, the form of FIG. 2) are not limited to those shown in the drawings. For example, the hash value storage section 33 and the determination result storage section 34 may be integrated into a single storage section. Moreover, all or an arbitrary part of the processing functions performed in each device can be realized by a CPU and a program analyzed and executed by the CPU, or may be realized as hardware by wired logic.

(3) Data Storage Program

Figure 16:
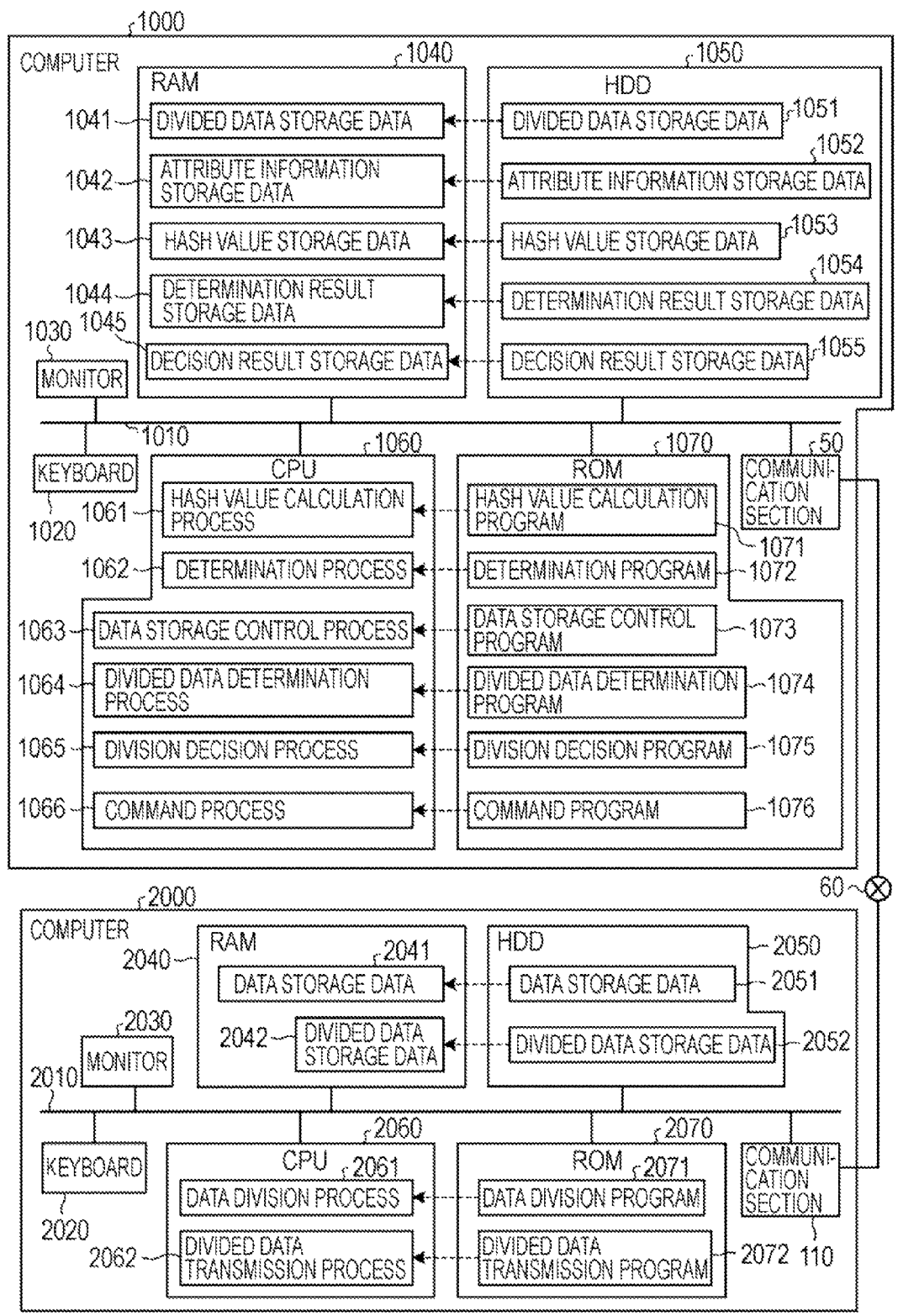
FIG. 16 is a diagram for explaining computers that execute a data storage program according to the fifth embodiment.

In the fourth embodiment described above, a case in which various processing is performed by hardware logic is described, this embodiment is not limited to this, and the various processing may be performed by executing a program prepared in advance on a computer. Therefore, hereinafter, an example of a computer that executes a data storage program having the same function as that of the data storage system described in the fourth embodiment will be described with reference to FIG. 16. FIG. 16 is a diagram for explaining computers that execute the data storage program according to the fifth embodiment.

First, a computer that executes a data storage program for controlling the archive device 10 in the data storage program will be described. As shown in FIG. 16, the computer 1000, which is an information processing device, includes a keyboard 1020, a monitor 1030, RAM 1040, HDD 1050, CPU 1060, and ROM 1070. The keyboard 1020, the monitor 1030, the RAM 1040, the HDD 1050, the CPU 1060, and the ROM 1070 are connected to each other via a bus 1010 or the like. Further, as shown in FIG. 16, the computer 1000 is connected to the computer 2000 via a communication section 50 and a network 60.

In the ROM 1070, the data storage program having the same function as that of the archive device 10 described in the fifth embodiment is stored in advance. In other words, as shown in FIG. 16, a hash value calculation program 1071, a determination program 1072, a data storage control program 1073, a divided data determination program 1074, a division decision program 1075, and a command program 1076 are stored in advance. These programs 1071 to 1076 may be appropriately integrated or distributed in the same way as the constituent elements of the archive device 10 shown in FIG. 14.

When the CPU 1060 reads these programs 1071 to 1076 from the ROM 1070 and executes them, as shown in FIG. 16, the programs 1071 to 1076 respectively function as a hash value calculation process 1061, a determination process 1062, a data storage control process 1063, a divided data determination process 1064, a division decision process 1065, and a command process 1066. The processes 1061 to 1066 respectively correspond to the hash value calculation section 21, the determination section 22, the data storage control section 23, the divided data determination section 24, the division decision section 25, and the command section 26 shown in FIG. 14.

As shown in FIG. 16, in the HDD 1050, a divided data storage data 1051, an attribute information storage data 1052, a hash value storage data 1053, a determination result storage data 1054, and a decision result storage data 1055 are provided. The divided data storage data 1051, the attribute information storage data 1052, the hash value storage data 1053, the determination result storage data 1054, and the decision result storage data 1055 respectively correspond to the divided data storage section 31, the attribute information storage section 32, the hash value storage section 33, the determination result storage section 34, and the decision result storage section 35 used in FIG. 14. The CPU 1060 registers a divided data storage data 1041, an attribute information storage data 1042, a hash value storage data 1043, a determination result storage data 1044, and a decision result storage data 1045 respectively corresponding to the divided data storage data 1051, the attribute information storage data 1052, the hash value storage data 1053, the determination result storage data 1054, and the decision result storage data 1055, reads the divided data storage data 1041, the attribute information storage data 1042, the hash value storage data 1043, the determination result storage data 1044, and the decision result storage data 1045, and stores these storage data in the RAM 1040. The CPU 1060 performs data storage processing on the basis of the divided data storage data 1041, the attribute information storage data 1042, the hash value storage data 1043, the determination result storage data 1044, and the decision result storage data 1045 stored in the RAM 1040.

Next, a computer that executes a data storage program for controlling the external device 70 in the data storage program will be described. As shown in FIG. 16, the computer 2000, which is an information processing device, includes a keyboard 2020, a monitor 2030, RAM 2040, HDD 2050, CPU 2060, and ROM 2070. The keyboard 2020, the monitor 2030, the RAM 2040, the HDD 2050, the CPU 2060, and the ROM 2070 are connected to each other via a bus 2010 or the like. Further, as shown in FIG. 16, the computer 2000 is connected to the computer 1000 via a communication section 110 and the network 60.

In the ROM 2070, the data storage program having the same function as that of the external device 70 described in the fifth embodiment is stored in advance. In other words, as shown in FIG. 16, a data division program 2071 and a divided data transmission program 2072 are stored in advance. These programs 2071 and 2072 may be appropriately integrated or distributed in the same way as the constituent elements of the external device 70 shown in FIG. 14.

When the CPU 2060 reads these programs 2071 and 2072 from the ROM 2070 and executes them, as shown in FIG. 16, the programs 2071 and 2072 respectively function as a data division process 2061 and a divided data transmission process 2062. The processes 2061 and 2062 respectively correspond to the data division section 81 and the divided data transmission section 82 shown in FIG. 14.

As shown in FIG. 16, in the HDD 2050, a data storage data 2051 and a divided data storage data 2052 are provided. The data storage data 2051 and the divided data storage data 2052 respectively correspond to the data storage section 91 and the divided data storage section 92 used in FIG. 14. The CPU 2060 registers a data storage data 2041 and a divided data storage data 2042 respectively corresponding to the data storage data 2051 and the divided data storage data 2052, reads the data storage data 2041 and the divided data storage data 2042, and stores these storage data in the RAM 2040. The CPU 2060 performs data storage processing on the basis of the data storage data 2041 and the divided data storage data 2042 stored in the RAM 2040.

The programs 1071 to 1076 and 2071 to 2072 need not necessarily be stored in the ROMs 1070 and 2070 from the beginning. For example, the programs may be stored in a "portable physical medium" such as a flexible disk (FD), a CD-ROM, an MO disk, a DVD disk, a magneto-optical disk, and an IC card inserted in the computers 1000 and 2000, or a "fixed physical medium" such as an HDD provided inside or outside the computer 1000, or further "another computer (or server)" connected to the computers 1000 and 2000 via a public line, the Internet, LAN, WAN, or the like, and the computers 1000 and 2000 may read the programs from such media or a computer and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An archive device comprising:
    a storage to store divided data and attribute information, the divided data being received from an external device and divided from original data by a predetermined size, the attribute information being associated with a hash value and identification information, the hash value being calculated from the divided data, the identification information identifying the original data before being divided; and
    a processor to
    calculate a hash value for the divided data that is received from the external device,
    write the divided data and the attribute information corresponding to the divided data to the storage when the calculated hash value for the divided data does not match the hash value included in the attribute information stored in the storage, and
    add the identification information corresponding to the calculated hash value to the attribute information when the calculated hash value matches the hash value included in the attribute information stored in the storage,
    the processor writes information indicating that a plurality of the original data includes a plurality of common divided data, respectively,
    the processor combines the plurality of common divided data and stores a hash value calculated from the combined divided data in the storage if a number of the original data including the plurality of common divided data is not less than a predetermined value.

2. The archive device of claim 1, wherein the processor notifies the predetermined size to the external device, the predetermined size being decided in accordance with the divided data stored in the storage.

3. A data storage system comprising:
    an external device to send divided data that is divided from original data by a predetermined size; and
    an archive device to store the divided data, comprising:
    a storage to store divided data and attribute information, the attribute information being associated with a hash value and identification information, the hash value being calculated from the divided data, the identification information identifying the original data before being divided; and a processor to calculate a hash value for the divided data that is received from the external device, write the divided data and the attribute information corresponding to the divided data to the storage when the calculated hash value does not match with the hash value included in the attribute information stored in the storage, and add the identification information corresponding to the calculated hash value to the attribute information when the calculated hash value matches with the hash value included in the attribute information stored in the storage, the processor writes information indicating that a plurality of the original data includes a plurality of common divided data, respectively, the processor combines the plurality of common divided data and stores a hash value calculated from the combined divided data in the storage if a number of the original data including the plurality of common divided data is not less than a predetermined value.

4. A method of storing data by an archive device comprising:

storing, by a processor, divided data and attribute information, the divided data being divided from original data by a predetermined size, the attribute information being associated with a hash value and identification information, the hash value being calculated from the divided data, the identification information identifying the original data before being divided;

calculating, by the processor, a hash value for divided data that is received from an external device;

writing, by the processor, the divided data and the attribute information corresponding to the divided data to a storage when the calculated hash value does not match with the hash value included in the attribute information stored in the storage; and adding, by the processor, the identification information corresponding to the calculated hash value to the attribute information when the calculated hash value matches with the hash value included in the attribute information stored in the storage, the processor writes information indicating that a plurality of the original data includes a plurality of common divided data, respectively, the processor combines the plurality of common divided data and stores a hash value calculated from the combined divided data in the storage if a number of the original data including the plurality of common divided data is not less than a predetermined value.

* * * * *